United States Patent Office 3,231,466
Patented Jan. 25, 1966

3,231,466
COMPOSITION AND METHOD FOR TREATING ANIMALS AND POULTRY
Walter H. Hoffman, 24 Crestview Drive, and Waitman P. Scott, 2353 S. Maryland, both of Springfield, Mo.
No Drawing. Filed Oct. 26, 1962, Ser. No. 233,437
9 Claims. (Cl. 167—53)

The present invention relates to a composition and a method for treating domesticated animals such as poultry, cattle, swine, etc., and, more particularly, to a composition and method for promoting growth response in animals suffering from non-specific diseases and sub-clinical infections. It includes a new free-choice method for treatment of the animals with active ingredients in more highly concentrated form than heretofore thought to be possible.

The invention constitutes an improvement in the compositions and methods disclosed in our Patent No. 2,946,722, issued June 26, 1960. As pointed out in our Patent No. 2,946,722, many animal diseases are readily identified as being caused by a specific organism. They respond to specific treatments, or may be controlled by vaccination. Other diseases, herein designated as "non-specific diseases" are those whose symptoms and causes are not easily recognized and are not readily and seldom positively diagnosed. Many conflicting symptoms and indications may be present. Such diseases include, in poultry, CRD (air-sac infection), enteritis, anemia, gizzard erosion, blue comb and mud fever (in turkeys), epidemic tremor, and hemorrhagic disease.

In swine, cattle and other mammals such diseases include scours, generalized anemias, diarrhea, mastitis as well as enteritis, hemorrhagic disease, and sub-clinical levels of many common but less frequently occurring infections.

In our aforementioned Patent 2,946,722, we disclosed a composition for treatment of poultry containing a water soluble salt of propionic acid, such as sodium propionate, and methylrosaniline chloride as antimicrobial agents along with complementary quantities of ferric-choline citrate, vitamin K and trace element compounds as stress relieving agents. The methylrosaniline chloride was found to be effective against many bacterial infections, fungal infections and to some degree, against some viruses. The propionates effectively suppress gram negative bacteria, the two compounds complementing each other in their action against non-specific diseases apparently caused by fungal and bacterial infections. The composition of our patent was utilized in either poultry feed or drinking water in which it was provided in low concentrations and was also provided in free-choice and relatively dilute form in a soft milk base food block.

The composition of the present invention utilizes the compounds of our previous invention, but in addition, contains ingredients rendering it more highly effective in the treatment of poultry as well as extending its use to domesticated mammals with highly successful results. The new composition contains iodine in organic form; namely, as choline iodide or ethylene dihydroiodide; phthalylsulfacetamide—a relatively non-toxic sulfa compound—and iron cobalt and copper in the form of choline citrate complexes. The use of these new ingredients permits higher overall concentration of effective active ingredients to be used, particularly in the new free-choice forms and methods hereinafter described.

An object of the invention is to provide improved prophylactic and therapeutic compositions and methods for enhancing the growth response and/or the general health of domesticated animals.

Another object of the invention is to provide compositions of the type described having improved therapeutic and prophylactic activity, through the use of novel combinations of antimicrobial agents and stress relieving agents, which are also in some instances, efficacious dietary supplements.

Another object of the invention is to provide improved compositions and methods for the treatment of debilitating and non-specific diseases affecting domesticated animals, including poultry, and to further provide a sustained growth response during such treatment.

A further object of the invention is to provide an improved balanced composition for combating adverse blood and growth conditions accompanying non-specific infections of domesticated animals.

Another object of the present invention is to provide an improved composition and method for free-choice treatment of poultry flocks, swine, cattle and other domesticated animals, which enables the operator to utilize the active ingredients in more highly concentrated and convenient form.

Another object of the invention is to provide a free-choice composition in dry, easily handled form in which the prophylactic and therapeutic ingredients are in relatively high concentration, but which can be safely administered for voluntary ingestion directly to the animals to be treated.

In our earlier composition inorganic iodides were used to supply beneficial trace quantities of iodine found useful in poultry nutrition. It has now been found that certain organic ammonium iodides, including ethylene diamine dihydroiodide and, preferably, choline iodide when used at proper levels, function not only as a valuable and more readily available source of dietary iodine, but also supply an antibacterial activity which serves to enhance and complement the antimicrobial action of the sodium propionate and methylrosaniline of the composition.

This combination provides a surprisingly effective antifungal and antibacterial action for the prevention and control of certain microorganisms which seem to be almost always present in environments where poultry and domestic animals are raised. It is effective in mammals as well as in fowl.

While the organic iodides are active against harmful bacteria and fungi when used alone, it has been found that far more beneficial effects are obtained by combining choline iodide with the other antimicrobial agents, growth-promoting, and stress-relieving agents of the overall composition as herein disclosed. The action of one agent appears to be improved or potentiated by the others.

At the time our earlier composition was introduced in the field, coccidiostats commercially available and applied in the feed seemed to provide an acceptable degree of control for coccidiosis in its various forms. However, the intensity of this disease complex has increased and the response to previously known coccidiostats has lessened. Further, it has been established that the primary disease complex known as the "CRD process" upon producing more advanced stages of general flock debilitation, resulted in a decreased feed intake and, of course, this resulted in a simultaneous reduction of coccidiostat intake so that adequately-protective levels were no longer being ingested by a considerable percentage of individuals within the flock. In such instances, the effectiveness of all medications administered with the feed for concurrent problems is seriously limited and, in many cases, practically neutralized. The presently disclosed, free-choice method for voluntary ingestion of medicated composition by the bird or animal separately from the normal feed and water ration solves this difficulty, and the use of phthalylsulfacetamides solves additional problems attendant the use of sulfa compounds.

Various sulfa compounds have been used for many years in the control of coccidiosis. Such commercially available sulfa compounds were tested as additions to our earlier composition with the hope of suppressing coccidiosis symptoms. However, the nature and complexity of the infective processes was such that the sick bird seemed ever more subject to severe toxic effects inherent to the sulfa compound. The use of the toxic sulfa often produced more stress than benefit, tending to seriously complicate hemorrhagic problems which have recently become constantly associated with almost any disease in poultry, swine or cattle.

After extensive experimentation, it was determined that phthalylsulfacetamide, a non-toxic sulfa which is wholly enteric in action, would supply the gentle suppressive coccidiostatic effect desired, is fully compatible with the other components of the composition, and at the same time, exerts a broad antibacterial action materially enhancing the effectiveness of the composition and providing a greater range of action.

The original composition was designed to (either directly or indirectly, by suppressing associated or secondary debilitating conditions) alleviate many disease complications in some degree, including iron deficiency anemias, which are a naturally occurring result of most disease complications, especially those which suppress feed intake or interfere with digestion and utilization of nutrients. Ferric choline citrate was used in the original composition for this purpose. The iron being organically available in this form, and having no toxic effect, the compound was found to be of unusual value for the desired purpose. Iron is not fully utilized, however, without available copper and cobalt. For these reasons copper sulfate and cobalt sulfate became parts of the original composition. It has subsequently been determined through continuing research that the choline citrate compounds of copper and cobalt are far more desirable in that they are less toxic, more readily available, and therefore, serve more adequately to enhance absorption and utilization of the iron than do the inorganic compounds, thereby greatly stimulating hemoglobin rise and increased red blood cell counts. The choline citrate forms of other trace minerals may also be utilized with results exceeding the values inherent to the inorganic salts of such minerals. It is believed desirable, however, in some instances to supply both organic and inorganic forms of the trace elements.

Widespread "scours" problems are prevalent in both swine and cattle, and in which anemia is a constant precursor or associated condition. In field tests with swine, formulations have been tested, using only ferric choline citrate together with the inorganic salts of copper and cobalt as the anti-anemia factors, and comparative tests have been conducted in which the choline citrate forms of copper and cobalt were additionally used. Each was administered to sows during the gestation and farrowing periods. The composition containing the organic forms of copper and cobalt, as well as ferric choline citrate, produced a result measurable as follows:

|  | Minimum, percent |
|---|---|
| Extra hemoglobin increase in pigs at 3 days of age | 20 |
| Extra iron in sows' milk after 10 to 20 days lactation | 500 |

As discussed in Patent 2,946,722, this composition is benefited by addition of vitamin K, preferably as menadione sodium bisulfite, trace element compounds, and, as necessary, a potassium compound. The menadione provides a valuable aid in combating the alteration in the blood conditions during critical periods and in combination with the other ingredients of the composition, seems more effective in reducing hemorrhagic symptoms than if used alone.

In certain instances where high-salt feed is used or where the drinking water contains a high-salt level, high-level use of sodium propionate may have some tendency to set up a sodium stress in the treated poultry. Accordingly, it is preferred to balance the sodium compound treating composition with a potassium compound, providing an amount of potassium generally equivalent to the sodium content of the sodium propionate.

The composition of the invention, therefore, comprises a non-toxic water-soluble salt of propionic acid, methylrosaniline, phthalylsulfacetamide, an organic iodide (preferably choline iodide), menadione sodium bisulfite (vitamin K) and iron, cobalt and copper choline citrates, additionally but not essentially containing a potassium compound, such as potassium chloride, copper sulfate, other trace elements in inorganic form, and various carriers and inert diluents. While it will be understood that the proportions of active ingredients can be varied widely without complete loss of effectiveness, the preferred balanced composition comprises about 10 to 40% sodium propionate, 0.1 to 0.6% methylrosaniline, 2 to 20% phthalylsulfacetamide, 0.01 to 0.1% choline iodide, 0.01 to 0.5% menadione sodium bisulfite, combined iron, cobalt and copper choline citrates 10 to 15%. The remainder of the mixture may include KCl, CuSO₄, trace minerals, nutrients and carriers, such as "Verxite" an exfoliated hydrobiotite.

While this composition may be used as a concentrate for addition to feeds in amounts of, e.g., 2 to 10 pounds per ton, it has surprisingly been found that the concentrate itself may be safely placed before animals such as swine and cattle for vountary free-choice consumption with effective administration, in spite of the fact that it has a blue-black color not generally associated with feedstuffs. Moreover, the animals have been found to have an inherent natural instinct which prevents them from an overdose of the concentrated active ingredients. For poultry, free-choice medication is desirably provided by admixture of the concentrate with, e.g., about 75 to 98% of dry nutrient, preferably dry milk solids such as dry whey, to provide a relatively highly concentrated composition effective in voluntary administration of the active ingredients.

The invention is further illustrated by the following examples of practice. In these examples the combined iron, copper and cobalt citrates contained about 12% total metal, with about 88% of the total metal being iron, about 9% being copper and about 3% being cobalt. These complexes are produced by the method generally set forth in Patent No. 2,575,611, with part of the iron being substituted by copper and cobalt. It will be understood that the proportions of iron, copper and cobalt exemplified are not critical and can be varied as desired to meet specific requirements.

*Example 1.—Swine formula (1 lb.)*

| | |
|---|---|
| Sodium propionate _____gms__ | 45.4 |
| Phthalylsulfacetamide _____gms__ | 20.0 |
| Methylrosaniline chloride _____gms__ | 1.5 |
| Vitamin A (feed) _____USP units__ | 200,000 |
| Vitamin D₂ (feed) _____USP units__ | 150,000 |
| Vitamin B₁₂ (feed) _____mg__ | 1.2 |
| Riboflavin _____gm__ | .35 |
| Calcium pantothenate _____gms__ | 1.0 |
| Niacin _____gms__ | 2.5 |
| Ferric choline citrate _____gms__ | 34.05 |
| Combined iron, copper and cobalt choline citrates _____gms__ | 34.05 |
| Choline iodide _____gm__ | 0.34 |
| Menadione sodium bisulfite _____gm__ | .1 |
| Trace minerals (Mn, Mg, Fe, Zn, etc.) ___gms__ | 90.8 |
| Copper sulfate _____gms__ | 90.8 |
| Choline chloride (25%) _____gms__ | 40.0 |
| Flavoring (anise) _____gm__ | .568 |
| Verxite No. 4 (exfoliated hydrobiotite) __gms__ | 15.89 |
| Potassium chloride _____gms__ | 29.51 |
| Anhydrous dextrose _____gms__ | [1] 35.64 |

[1] Approximately, to fill.

This concentrated composition may be effectively employed by adding, as required, to the feed, or by setting before the swine separately from the normal feed for voluntary free-choice consumption.

*Example 2*

The swine formula of Example 1 was administered to sows during the gestation period, and resulted in hemoglobin weights of 16 grams per 100 cc. of blood in the farrowed three-day old pigs, whereas, the averages obtained even through application of iron-sugar injections directly to the baby pig, have not exceeded 12 grams per 100 cc. The normal iron content of sows' milk is not known to average in excess of 3 milligrams per liter of milk, whereas two samples each taken from two groups of 4 sows each, 10 to 20 days after beginning of lactation, registered an actual laboratory analysis of 108 to 120 milligrams of iron, respectively per liter of milk.

It is important to note that for many years scientists have in efforts with various types of orally administered iron compounds or complexes of mineral compounds which included iron, markedly failed, in oral administration, to produce an iron level in sows' milk which was sufficient to prevent anemia in the baby pig.

*Example 3.—Calf and cattle formula (concentrate) (1 lb.)*

| | | |
|---|---|---|
| Sodium propionate | gms | 136.2 |
| Phthalylsulfacetamide | gms | 16.0 |
| Methylrosaniline chloride | gms | 1.2 |
| Vitamin A (feed) | USP units | 800,000 |
| Vitamin $D_2$ (feed) | USP units | 500,000 |
| Vitamin $B_{12}$ (feed) | mg | 1.5 |
| Vitamin E (feed) | I.U. | 500 |
| Riboflavin | gm | .1 |
| D calcium pantothenate | gm | .1 |
| Niacin | gm | .2 |
| Combined iron, copper and cobalt choline citrates | gms | 68.1 |
| Menadione sodium bisulfite | gm | .1 |
| Potassium chloride | gms | 90.8 |
| Magnesium sulfate | gms | 4.0 |
| Manganese sulfate | gms | 5.72 |
| Zinc sulfate | gms | 2.62 |
| Choline iodide | gm | .09 |
| Flavoring (anise) | gms | 1.135 |
| Verxite No. 4 (exfoliated hydrobiotite) | gms | 22.7 |
| Choline chloride (25%) | gms | [1] 85.81 |

[1] Approximately, to fill.

The calf and cattle formula may likewise be added to the feed or, preferably, used directly by the free-choice method. The composition has been found to be extraordinarily effective in the treatment and prevention of "scours" in cattle as well as swine.

*Example 4.—Calf formula (bolus mix) (1 lb.)*

| | | |
|---|---|---|
| Sodium propionate | gms | 120.0 |
| Phthalylsulfacetamide | gms | 80.0 |
| Methylrosaniline chloride | gms | 2.4 |
| Vitamin A (feed) | USP units | 100,000 |
| Vitamin $D_2$ (feed) | USP units | 50,000 |
| Vitamin $B_{12}$ (feed) | mg | .5 |
| Vitamin E (feed) | I.U. | 1,500 |
| Riboflavin | gm | .3 |
| D calcium pantothenate | gm | .6 |
| Niacin | gms | 3.0 |
| Iron, copper and cobalt choline citrates | gms | 68.1 |
| Menadione sodium bisulfite | gm | 1.0 |
| Potassium chloride | gms | 84.9 |
| Magnesium sulfate | gms | 5.0 |
| Manganese sulfate | gms | 7.15 |
| Zinc sulfate | gms | 3.15 |
| Choline iodide | gm | .64 |
| Mogul starch | gms | [1] 64.92 |

[1] Approximately, to fill.

The formulation of Example 4 is particularly useful for application in bolus form in dosage units of, e.g., 1 ounce or more, but may also be used in feed and for free-choice application.

*Example 5.—Poultry formula (concentrate) (1 lb.)*

| | | |
|---|---|---|
| Sodium propionate | gms | 136.2 |
| Phthalylsulfacetamide | gms | 16 |
| Methylrosaniline chloride | gms | 1.2 |
| Vitamin A | USP units | 250,000 |
| Vitamin $D_3$ | USP units | 125,000 |
| Vitamin $B_{12}$ | mg | .6 |
| Vitamin E | I.U. | 50 |
| Riboflavin | gms | .4 |
| D calcium pantothenate | gms | .85 |
| Niacin | gms | 2.5 |
| Iron, copper, cobalt choline citrates | gms | 27.24 |
| Ferric choline citrate | gms | 27.24 |
| Menadione sodium bisulfite | gms | .752 |
| Copper sulfate | gms | 45.4 |
| Potassium chloride | gms | 90.8 |
| Magnesium sulfate | gms | 3.995 |
| Manganese sulfate | gms | 5.725 |
| Zinc sulfate | gms | 2.542 |
| Choline iodide | gms | .34 |
| Anise (flavor) | gms | 1.13 |
| Kelp | gms | 22.7 |
| Verxite No. 4 (exfoliated hydrobiotite) | gms | 18.16 |
| Anhydrous dextrose | gms | [1] 43.80 |

[1] Approximately, to fill.

This formulation applied as an additive to poultry feeds has been found to be dramatically effective in the treatment and control of CRD as well as enteritis, anemia, hemorrhagic disease, and nutritional deficiencies. There was further, a significant increase in growth response, general vitality; and a lowered mortality rate.

*Example 6.—Dry free-choice poultry formula (1 lb.)*

| | | |
|---|---|---|
| Sodium propionate | mg | 6,810 |
| Phthalylsulfacetamide | mg | 800 |
| Methylrosaniline chloride | mg | 90 |
| Vitamin A | USP units | 12,500 |
| Vitamin $D_3$ | USP units | 6,250 |
| Vitamin $B_{12}$ | mcgm | 60 |
| Vitamin E | I.U. | 2.5 |
| Riboflavin | mg | 20 |
| D calcium pantothenate | mg | 42 |
| Niacin | mg | 125 |
| Combined metals (ferric choline citrate, copper choline citrate, cobalt choline citrate) | mg | 1,362 |
| Ferric choline citrate | mg | 1,362 |
| Menadione sodium bisulfite | mg | 38 |
| Copper sulfate | mg | 2,270 |
| Potassium chloride | mg | 4,540 |
| Magnesium sulfate | mg | 200 |
| Manganese sulfate | mg | 286 |
| Zinc sulfate | mg | 127 |
| Choline iodide | mg | 17 |
| Anise (flavor) | mg | 57 |
| Anhydrous dextrose | mg | 2,190 |
| Dried kelp | gms | 23.83 |
| Mogul starch | gms | 45.4 |
| Verxite No. 4 (exfoliated hydrobiotite) | gms | 12.26 |
| Dried whole whey | gms | 351.85 |

The ingredients of the composition are thoroughly blended to form a homogeneous, free-flowing mixture, the usual procedures for incorporating minor amounts of active ingredients in the mix being employed.

In order to facilitate blending and free flow as well as to provide nutritional value to the composition, dry sea kelp has been used in the composition. This material provides many of the trace elements in minute quantities in organically available form, and its texture facilitates free flow. The starch also promotes better flow and smoothness to the mixture. A small amount of dextrose provides immediately-available energy.

The dried whole whey of the above composition, while constituting one of the preferred nutrient carriers and having beneficial growth promoting and complementing action in coccidiosis suppression and control, may be substituted in whole or in part by other diluents, preferably of nutrient value and in dry form, e.g., ground cereals, meat and vegetable meals, etc.

The new composition can, of course, be incorporated in a soft-milk food block as disclosed in our previous patent. However, the dry free-choice form offers many advantages totally unexpected from our experience with the previous formula. With poultry, a much less concentrated composition is advocated than with swine, cattle and other livestock. In the previous soft-food form, the concentration was purposely held at a relatively low level to avoid over-medication with undesirable side effects. In the dry free-choice form with the new balanced formula and added or modified ingredients, it has been found possible to increase the concentrations for poultry up to five to ten times that previously thought possible, without danger of over-medication, but with improved results. The new dry and more highly concentrated form provides outstanding results in the control of CRD in poultry. After numerous field tests in which the control birds developed severe symptoms of CRD, not one of the flocks given the free-choice, dry mix developed symptoms which were significant or cause for alarm. It has been found to be superior to the soft foods form for this purpose, the latter sometimes requiring auxiliary treatment.

The dry composition is readily administered to the flock or herds. It can be poured into plates, bowls, feeders, troughs or other convenient receptacle, placed at intervals in the poultry house, hog lot, farrowing crates for baby pigs, or at any point convenient to the husbandryman, the only requirement being that the birds or animals to be treated have free access to a continuous supply of the composition.

The compositions herein disclosed are useful in the treatment of all domesticated animals including poultry, swine, cattle, calves, sheep, goats, mink, quail, pheasants, geese, ducks, rabbits, and other species, modifications being made where necessary to suit the needs of the particular species.

We claim:

1. A composition for animal treatment consisting essentially of a non-toxic, water-soluble salt of propionic acid, methylrosaniline chloride, phthalylsulfacetamide, an organic iodide selected from the group consisting of ethylene diamine dihydroiodide and choline iodide, menadione sodium bisulfite, and iron, cobalt and copper choline citrates.

2. The composition of claim 1 wherein the non-toxic, water-soluble salt of propionic acid is sodium propionate and including a potassium compound in an amount providing a quantity of potassium approximately equivalent to the sodium content of the sodium propionate, copper sulfate, additional vitamins, and additional trace elements in inorganic form.

3. A composition for animal treatment containing the following ingredients in the ratio of the approximate percentages by weight set forth: sodium propionate 10 to 40%; methylrosaniline chloride 0.1 to 0.6%; phthalylsulfacetamide 2 to 20%; choline iodide 0.01 to 0.1%; menadione sodium bisulfite 0.01 to 0.5%; and iron, cobalt, and copper choline citrates, combined 10 to 15%.

4. A dry, free-flowing composition for the free-choice treatment of poultry, comprising the ingredients set forth in claim 1 in admixture with a dry nutrient carrier, said ingredients being present in said admixture in the amount of about 2 to 25 percent.

5. The composition of claim 4 wherein said nutrient carrier is a dry milk product.

6. A method for the free-choice treatment of poultry, comprising setting before the poultry flock for separate voluntary oral ingestion, in addition to the normal feed and water rations, a dry free-flowing nutrient carrier having admixed therewith from about 2 to 25 percent by weight of a composition comprising a non-toxic, water-soluble salt of propionic acid, methylrosaniline chloride, phthalylsulfacetamide, an organic iodide selected from the group consisting of ethylene diamine dihydroiodide and choline iodide, menadione sodium bisulfite, and iron, cobalt and copper choline citrates.

7. A method for the free-choice treatment of domesticated animals, comprising setting before said animals for separate voluntary oral ingestion, in addition to the normal feed and water rations, a composition consisting essentially of a non-toxic, water-soluble salt of propionic acid, methylrosaniline chloride, phthalylsulfacetamide, an organic iodide selected from the group consisting of ethylene diamine dihydroiodide and choline iodide, menadione sodium bisulfite, and iron, cobalt and copper choline citrates.

8. A method for the free-choice treatment of swine and cattle, comprising setting before said animals for separate voluntary oral ingestion, in addition to the normal feed and water rations, a composition containing the following ingredients in approximately the percentages by weight set forth: sodium propionate, 10 to 40%; methylrosaniline chloride 0.1 to 0.6%; phthalylsulfacetamide 2 to 20%; choline iodide 0.01 to 0.1%; menadione sodium bisulfite 0.01 to 0.5%; and iron, cobalt, and copper choline citrates, combined 10 to 15%.

9. The method of claim 6 wherein the composition admixed with the carrier contains the ingredients in the approximate percentages by weight as follows: sodium propionate 10 to 40%; methylrosaniline chloride 0.1 to 0.6%; phthalylsulfacetamide 2 to 20%; choline iodide 0.01 to 0.1%; menadione sodium bisulfite 0.01 to 0.5% and iron, cobalt, and copper choline citrates, combined 10 to 15%.

References Cited by the Examiner

UNITED STATES PATENTS 2,946,722   7/1960   Hoffman _____ 167—53.1

OTHER REFERENCES

Chemical Abstracts Decennial Index (C.A.), vol. 41–50, 1947–1956, page 3072S.

The Merck Index, Seventh Edition, 1960, Merck and Co., Rahway, New Jersey, page 813.

JULIAN S. LEVITT, *Primary Examiner.*

FRANK CACCIAPAGLIA, Jr., LEWIS GOTTS,
*Examiners.*